No. 759,628. PATENTED MAY 10, 1904.
N. NICOLAI.
COVER FOR TRUCK OR WAGON FRAMES.
APPLICATION FILED OCT. 28, 1903.
NO MODEL. 2 SHEETS—SHEET 1.
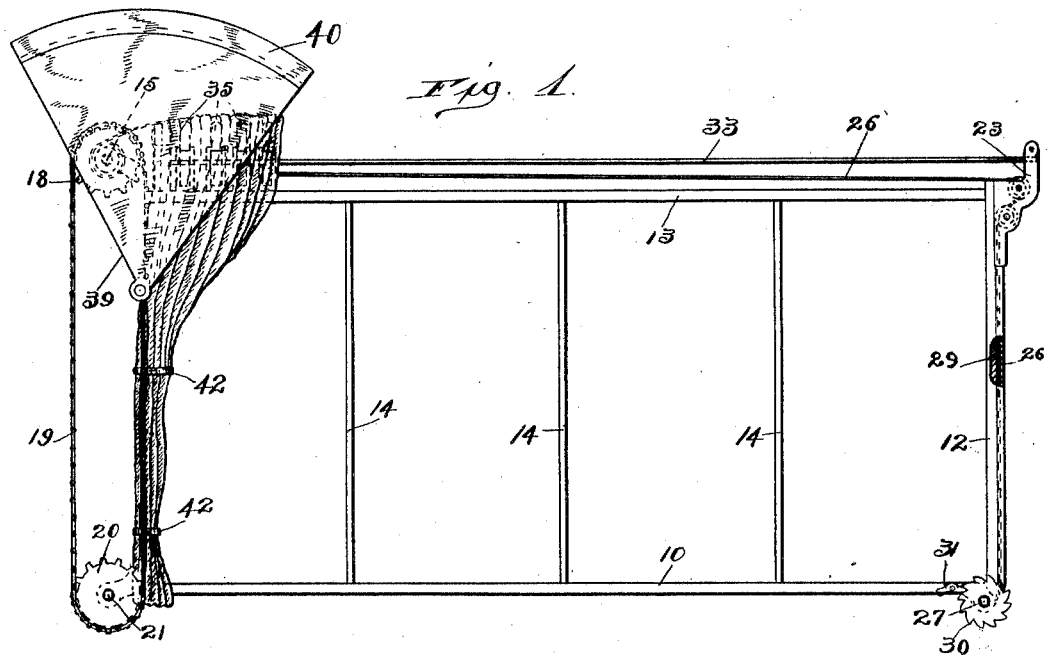
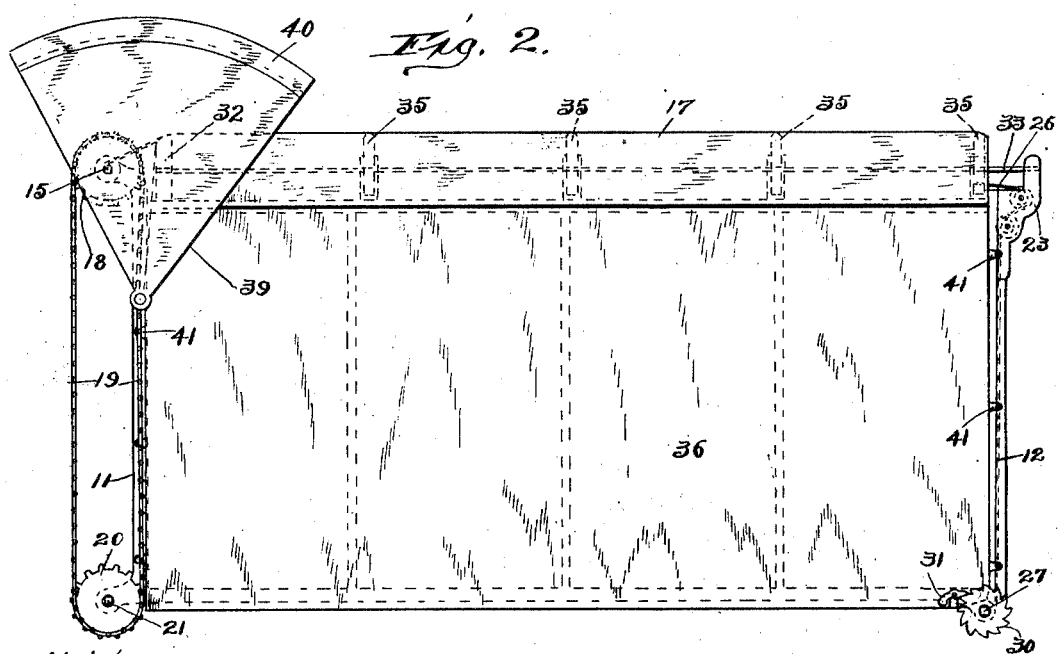

No. 759,628. PATENTED MAY 10, 1904.
N. NICOLAI.
COVER FOR TRUCK OR WAGON FRAMES.
APPLICATION FILED OCT. 28, 1903.
NO MODEL. 2 SHEETS—SHEET 2.
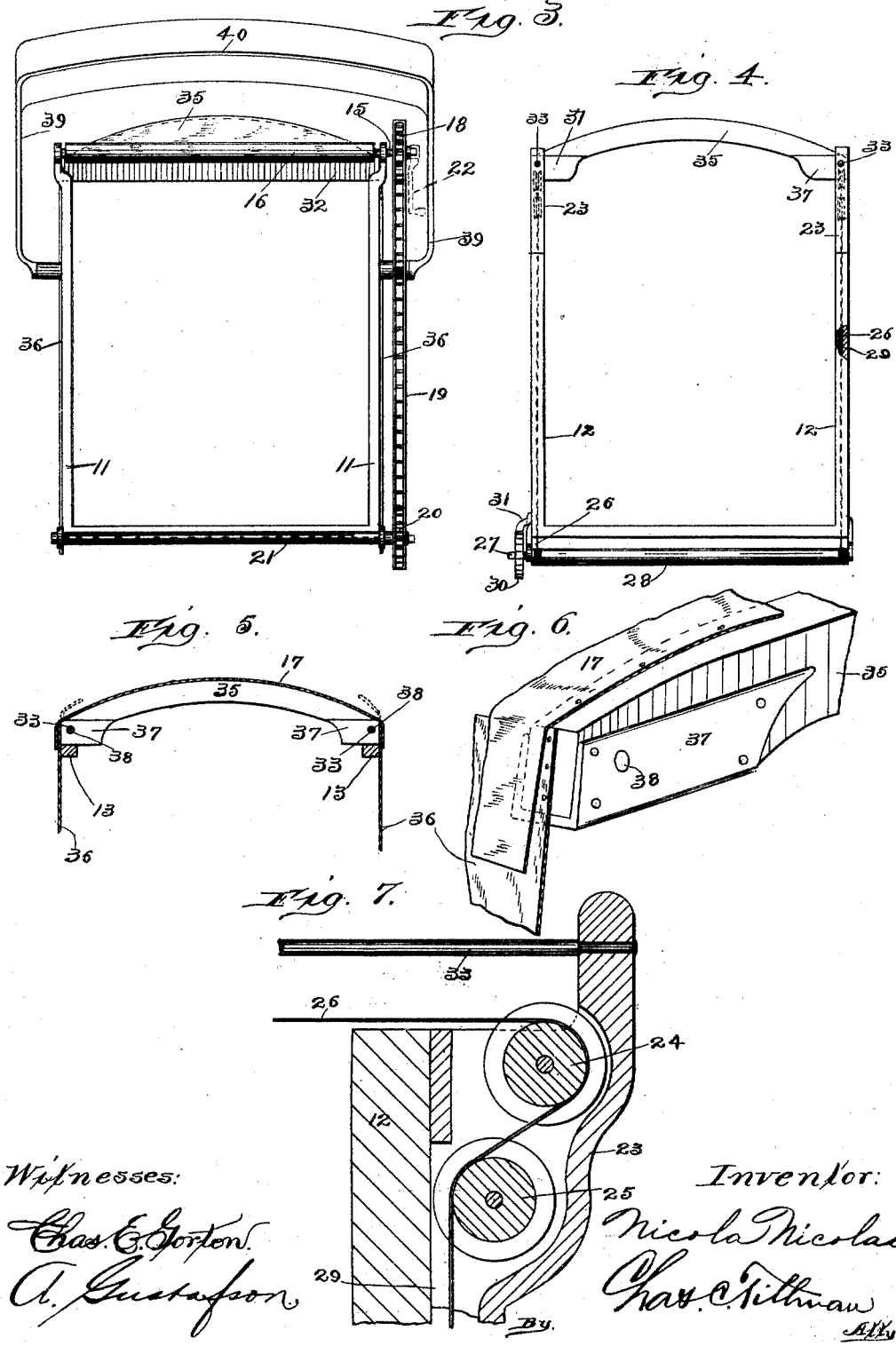

No. 759,628. Patented May 10, 1904.

UNITED STATES PATENT OFFICE.

NICOLA NICOLAI, OF CHICAGO, ILLINOIS.

COVER FOR TRUCK OR WAGON FRAMES.

SPECIFICATION forming part of Letters Patent No. 759,628, dated May 10, 1904.

Application filed October 28, 1903. Serial No. 178,825. (No model.)

*To all whom it may concern:*

Be it known that I, NICOLA NICOLAI, a citizen of the United States, residing at Chicago, in the county of Cook and State of Illinois, have invented certain new and useful Improvements in Covers for Truck or Wagon Frames, of which the following is a specification.

This invention relates to improvements in a cover for the frames of wagons, trucks, and the like; and it consists in certain peculiarities of the construction, novel arrangement, and operation of the various parts thereof, as will be hereinafter more fully set forth and specifically claimed.

The principal object of the invention is to provide a cover of the above-named character which shall be simple and inexpensive in construction, strong, durable, and so made that it may be folded or bunched into a compact form at the front portion of the frame, so as to be out of the way when loading or unloading, and may be easily and quickly stretched so as to cover the entire frame when it is desired to protect the load from rain or snow.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view in side elevation of a truck or wagon frame removed from the wagon, showing it equipped with a cover embodying my invention and illustrating the cover in its folded position. Fig. 2 is a similar view of like parts, showing the cover stretched over the entire frame. Fig. 3 is a front end view of the frame with the covering in place thereon. Fig. 4 is a rear end view of the frame with the covering removed. Fig. 5 is a transverse sectional view of the upper portion of the frame and covering. Fig. 6 is an enlarged perspective view of a portion of one of the transverse bars or riders which support the roof and walls of the covering, showing a portion of each secured thereto; and Fig. 7 is an enlarged vertical sectional view of a portion of one of the rear standards of the frame, showing the pulleys thereon for one of the operating-cables.

Like numerals of reference refer to corresponding parts throughout the different views of the drawings.

The frame to which my covering is applied may be of the ordinary or any preferred construction; but in the present instance I have shown it as comprising a rectangular floor 10, having at its front and rear corners main standards 11 and 12, respectively, which are united together at their upper portions by means of horizontal rails 13, which extend longitudinally with the floor. Interposed between the main standards 11 and 12 and extending from each side edge of the floor 10 to the rails 13 are a number of uprights 14, which, together with the floor, main standards, and rails 13, compose the frame. Transversely journaled on the upper portion of the main standards 11 on the front of the frame is a shaft 15, on which is mounted a roller 16, to which the front end of the roof portion 17 of the covering is secured. Mounted on one end of the shaft 15 is a sprocket-wheel 18, over which is passed a sprocket-chain 19, which also passes over and engages a sprocket-wheel 20, mounted on one end of the shaft 21, transversely journaled on the lower front portion of the frame. Each of the shafts 15 and 21 has one of its ends squared or formed to receive a crank-handle 22, used for turning them so as to wind the roof portion of the cover on the roller 16, as is apparent. While I have shown the shafts 15 and 21 provided with sprocket-wheels 18 and 20, respectively, and connected or geared together by means of a chain 19 and prefer to use said construction so that the roller 16 may be rotated from the ground by applying the crank-handle to the shaft 21 or from the driver's seat (not shown) by applying said crank to the shaft 15; yet it is evident that I may omit said wheels and chain and may operate the roller 16 by means of the crank attached directly to the end of its shaft. Mounted on the rear portion of each of the main standards 12 at the rear end of the frame is a hollow bracket 23, in each of which are journaled two pulleys 24 and 25, over which the operating-tables 26 pass.

Transversely journaled on the lower rear portion of the frame is a shaft 27, on which is mounted a roller 28, to which near each of its ends is attached one end of each of the operating-cables 26, which have their other ends connected to the rear supporting bar or rider, as will be presently explained. These cables pass through vertical grooves 29 in the rear main standards 12, as is clearly shown in Figs. 4 and 7 of the drawings. Mounted on one end of the shaft 27 is a ratchet-wheel 30, which is engaged by a pawl 31, pivotally secured on the frame to prevent the roller turning in its backward movement except when desired. One end of the shaft 27 is squared or formed to receive a crank-handle to be used for rotating the roller 28 when it is desired to wind the operating-cables thereon. Located transversely on the upper portion of the front part of the frame and fixed thereto is a bar 32, over which the roof portion 17 of the cover passes. Secured at one of their ends to the cross-bar 32, near each of its ends, are guide rails or rods 33, the other ends of which are secured to the upper portion of the brackets 23, so that said rods will be located a slight distance above the rails 13 and independently thereof, so that when the frame is heavily loaded and the rails 13 and uprights 14 may be pressed outwardly they will not be affected thereby. Movably mounted transversely on the guide rails or rods 33 are a series of supporting bars or riders 35, which support the roof portion 17 of the cover and also the side portions 36 thereof. Each end of each of the supporting-bars 35 is preferably provided with a protecting-clip 37, each of which is provided with an opening 38 to register with openings in the bar for the reception and operation of the guide-rods 33, as will be readily understood by reference to the drawings.

The side portions 36 of the cover are secured at their upper portions to the ends of the bars 35, thus uniting them together. The main uprights 11 at the front of the frame have secured thereto a top or hood 40, which is located above the cover when it is in its folded position, as shown in Fig. 1 of the drawings.

From the foregoing and by reference to the drawings it will be seen and readily understood that when it is desired to extend the covering which comprises the roof portion 17 and the side walls or parts 36, which may be of canvas or any other suitable material, so as to cover the entire frame, the crank-handle may be placed on the shaft 27, when by turning it in the proper direction the cross-bar 35 nearest the rear end of the frame will be drawn or slid rearwardly on the guide-rails 33 by reason of its connection with the roller 28 through the medium of the cables 26, which are wound on said roller. As the said bar is slid or drawn farther rearwardly it is apparent that the roof portion 17 of the cover, which is secured to the top of said bar, as well as the side portions 36, which are secured to its ends, will be extended, thus making that part of the side portions between said bar and the one adjacent thereto taut, when the last-named bar will be drawn rearwardly, which operation will continue throughout the series of bars until the entire frame is covered, when the side portions may be secured, by means of straps 41, to the main standards of the frame. When it is desired to uncover the frame, the pawl 31 is disengaged from the ratchet-wheel 30, when by applying the crank to either of the shafts 15 or 21 it is evident that the roof portion of the cover will be wound on the roller 16, thus drawing the supporting bars or riders 35 forwardly on the guide-rails, so as to occupy a small space at the front of the frame, in which position the side portions may be secured by means of suitable straps 42 or otherwise.

Having thus fully described my invention, what I claim as new, and desire to secure by Letters Patent, is—

1. The combination with the frame, of the guide-rails mounted on its upper portion, a series of supporting-bars movably mounted on said rails, a roller journaled across the upper front portion of the frame, a sheet secured at one of its ends to said roller and at its other end to the rearmost supporting-bar, another roller journaled across the lower rear portion of the frame, cables connected at one of their ends to said bar and at their other ends to the lower roller, a sheet secured to the ends of the supporting-bars, and means to rotate the rollers, substantially as described.

2. The combination with the frame having vertical grooves in its rear standards, of the guide-rails mounted in parallelism on the upper portion of the frame, a series of supporting-bars movably mounted on said rails, a roller journaled across the upper front portion of the frame, a sheet secured at one of its ends to said roller and at its other end to the rearmost supporting-bar, another roller journaled across the lower portion of the frame beneath the rear standards thereof, cables located in the grooves of the rear standards and connected at one of their ends to said bar and at their other ends to the lower roller, a sheet secured to the ends of the supporting-bars, and means to rotate the rollers, substantially as described.

NICOLA NICOLAI.

Witnesses:
CHAS. C. TILLMAN,
A. GUSTAFSON.